(12) United States Patent
Taylor

(10) Patent No.: US 10,343,293 B1
(45) Date of Patent: Jul. 9, 2019

(54) PORTABLE ENCLOSURE FOR HAZARDOUS PROCESSING

(71) Applicant: Troy Taylor, Suquim, WA (US)

(72) Inventor: Troy Taylor, Suquim, WA (US)

(*) Notice: Subject to any disclaimer, the term of this patent is extended or adjusted under 35 U.S.C. 154(b) by 0 days.

(21) Appl. No.: 15/849,156

(22) Filed: Dec. 20, 2017

(51) Int. Cl.
B25J 21/02 (2006.01)
B08B 15/02 (2006.01)

(52) U.S. Cl.
CPC ............ *B25J 21/02* (2013.01); *B08B 15/026* (2013.01)

(58) Field of Classification Search
CPC .......... B25J 21/02; B08B 15/026; G21F 7/04; B01L 1/04; F24F 3/161
USPC ............... 312/1, 257.1, 3, 4, 5, 6, 209, 114; 55/385.2; 454/56, 57, 187; 600/21, 22; 422/565
See application file for complete search history.

(56) References Cited

U.S. PATENT DOCUMENTS

| | | | | |
|---|---|---|---|---|
| 1,331,207 | A * | 2/1920 | Mouneyrat | B25J 21/02 422/199 |
| 3,088,627 | A * | 5/1963 | Saunders | B25J 21/02 220/377 |
| 3,895,570 | A | 7/1975 | Eagleson, Jr. | |
| 3,907,389 | A | 9/1975 | Cox et al. | |
| 4,089,571 | A * | 5/1978 | Landy | A61G 10/005 220/804 |
| 4,697,854 | A * | 10/1987 | Lunsford | B25J 21/02 220/4.21 |
| 4,780,927 | A * | 11/1988 | Clayton | B08B 15/026 15/345 |
| 5,095,925 | A * | 3/1992 | Elledge | A61C 19/002 134/61 |
| 5,316,733 | A * | 5/1994 | Rune | B25J 21/02 312/1 |
| 5,407,389 | A | 4/1995 | Poblete et al. | |
| 5,730,765 | A * | 3/1998 | Henry | B01L 1/02 454/184 |
| 5,928,075 | A | 7/1999 | Miya et al. | |
| 5,971,839 | A * | 10/1999 | Schmelzer | B01D 46/0004 451/451 |
| 6,241,328 | B1 * | 6/2001 | Ziff | A61C 13/12 312/1 |
| 6,660,227 | B2 * | 12/2003 | Lopez Ordaz | A61L 2/0011 209/578 |

(Continued)

FOREIGN PATENT DOCUMENTS

GB 2109921 * 6/1983

OTHER PUBLICATIONS

Portable Glove Box. Product listing [online]. © Copyright 2009-2016 Cleatech, LLC, [retrived on Oct. 5, 2017]. Retrieved from the Internet: <URL: http://www.laboratory-supply.net/gloveboxes/shop_portable_glove_box_system.html>.

*Primary Examiner* — James O Hansen
(74) *Attorney, Agent, or Firm* — Cramer Patent & Design, PLLC; Aaron R. Cramer

(57) ABSTRACT

A portable enclosure provides a means to protect a user while performing hazardous processes upon a work piece such as grinding, sanding, drilling, painting, chemical washing, and the like. The enclosure provides a portable box-like structure having transparent plastic panels, an open-bottom portion, and a pair of glove ports. The enclosure is intended to be placed over the work piece which is positioned upon a floor surface, thereby allowing performance of hazardous processing without having to move or lift the work piece.

10 Claims, 4 Drawing Sheets

(56) References Cited

U.S. PATENT DOCUMENTS

| | | | |
|---|---|---|---|
| 6,685,622 B2* | 2/2004 | O'Connor | A61B 90/40 |
| | | | 312/1 |
| 6,973,997 B2* | 12/2005 | Fara | B08B 15/026 |
| | | | 182/141 |
| 6,974,197 B1 | 12/2005 | Henry et al. | |
| 7,077,486 B2* | 7/2006 | Tattershall | B01L 1/50 |
| | | | 312/1 |
| 8,579,387 B2 | 11/2013 | Zhang | |
| 2003/0076011 A1* | 4/2003 | Brownfiel, Jr. | B25J 21/02 |
| | | | 312/1 |
| 2003/0103881 A1* | 6/2003 | Lane | A61L 2/26 |
| | | | 422/292 |

\* cited by examiner

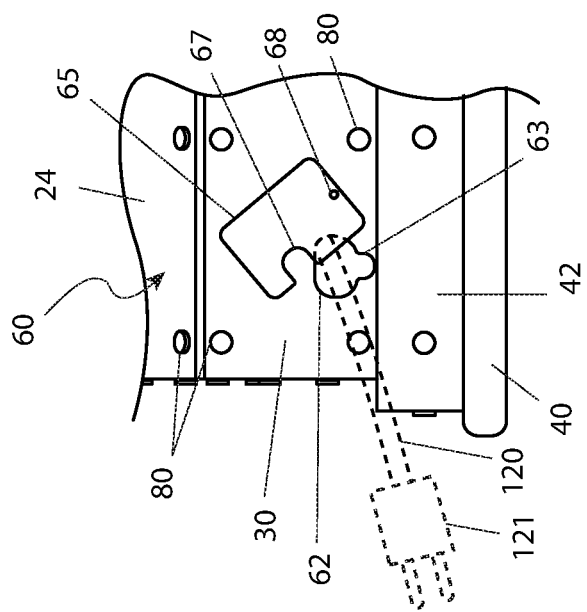
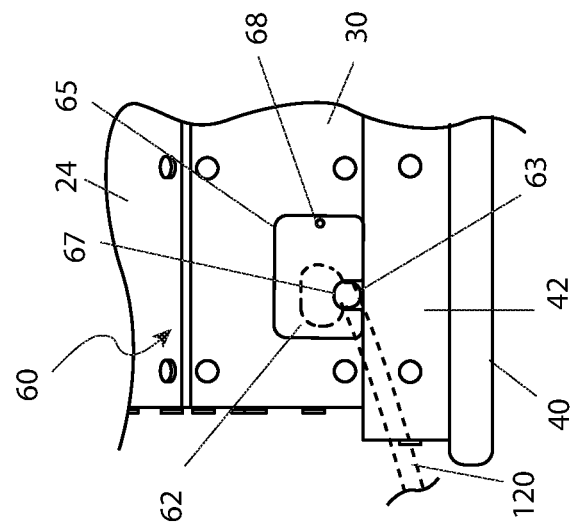

US 10,343,293 B1

PORTABLE ENCLOSURE FOR HAZARDOUS PROCESSING

RELATED APPLICATIONS

Not applicable.

FIELD OF THE INVENTION

The present invention relates generally to the field of portable enclosures for processing of hazardous materials.

BACKGROUND OF THE INVENTION

When working in environments where exposure to chemicals, thermal energy, or other hazards, it is imperative that the proper work surfaces be utilized. A lot of times, the work surfaces must be utilized in extreme or remote work locations, such as job sites and such, where the use of bulky, heavy, and complicated equipment is troublesome at best and impossible at worst. Also, often times it is burdensome to transport and don personal protective safety equipment every time a task as described above is needed, especially if the task itself is very short and/or needs to be conducted multiple times, such as on-site fitting and fine-tuning of an installation of material.

A lot of these work surfaces would also benefit from universal use, where the hazards aren't necessary dangerous, but cumbersome and messy, such as during metal or wood grinding activities or welding. Such as work surface would also be beneficial if it could be reasonably interchangeably used for many different types of work needs.

Another benefit would be to provide a comfortable method to perform such work events. It is common to kneel on the ground and perform these tasks when other work benches and surfaces are not available or would be too time consuming to erect. Accordingly, there exists a need for means by which a portable containment device for performing work activities in a sealed environment and in a relatively comfortable manner can be quickly and easily utilized without the disadvantages as described above. The development of the portable enclosure for ceiling fan blades fulfills this need.

SUMMARY OF THE INVENTION

The principles of the present invention provide for providing an assembly including a first side panel, a second side panel parallel to the first side panel, a rear panel, affixed between rear sides of the first and second side panel, a front panel, affixed between front sides of the first and second side panel, a glove port panel, affixed between angled portions of a top side of the first and second side panel and a top side of the front panel, and a lid panel, having a rear edge hingedly attached to a top edge of the rear panel. The lid panel covers over portion of the top side of the first and second side panel rearward of the glove port panel. A cord aperture is located on the front panel, with a pivoting cord cover plate located adjacent thereto. A hose port is located on either the first or second side panel, capable of providing a sealed connection to a hose. The glove port panel has a pair of glove ports, each capable of having a glove sealingly affixed thereto. In some embodiments, a board functioning as a kneeling pad is capable of being affixed to the bottom of the assembly, extending away from the front panel and glove port panel. A sealing means for sealing bottom perimeter edges of the assembly and the board (if provided) to a subjacent support surface is also envisioned. Such a sealing means can include a rubber gasket, which may further include an integral and upwardly extending gasket flange.

A further object of the invention is to include a plurality of brackets affixing adjacent panels to each other. In certain embodiments, the plurality of brackets are each a connecting ninety-degree angle (90°) bracket.

Another object of the invention is to provide that the glove port panel and the lid panel are transparent.

Yet another object of the invention is to provide that the first and second gloves each are a flexible, chemical-resistant material. In certain embodiments, the first glove is affixed to the first glove port with a first sleeve flange such that a first glove clamp plate affixed to the glove port panel about a perimeter edge of the first glove port clamps the first sleeve flange thereto. Similarly, the second glove is affixed to the second glove port with a second sleeve flange such that a second glove clamp plate affixed to the glove port panel about a perimeter edge of the second glove port clamps the second sleeve flange thereto. In other embodiments, the first and second glove port are not coaligned along a common bisecting axial centerline through the glove port panel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4a is a close-up view of a cord aperture assembly 60 depicting an open state, according to a preferred embodiment of the present invention; and, FIG. 4b is a close-up view of the cord aperture assembly 60 depicting a closed state, according to a preferred embodiment of the present invention.

Figure 1:
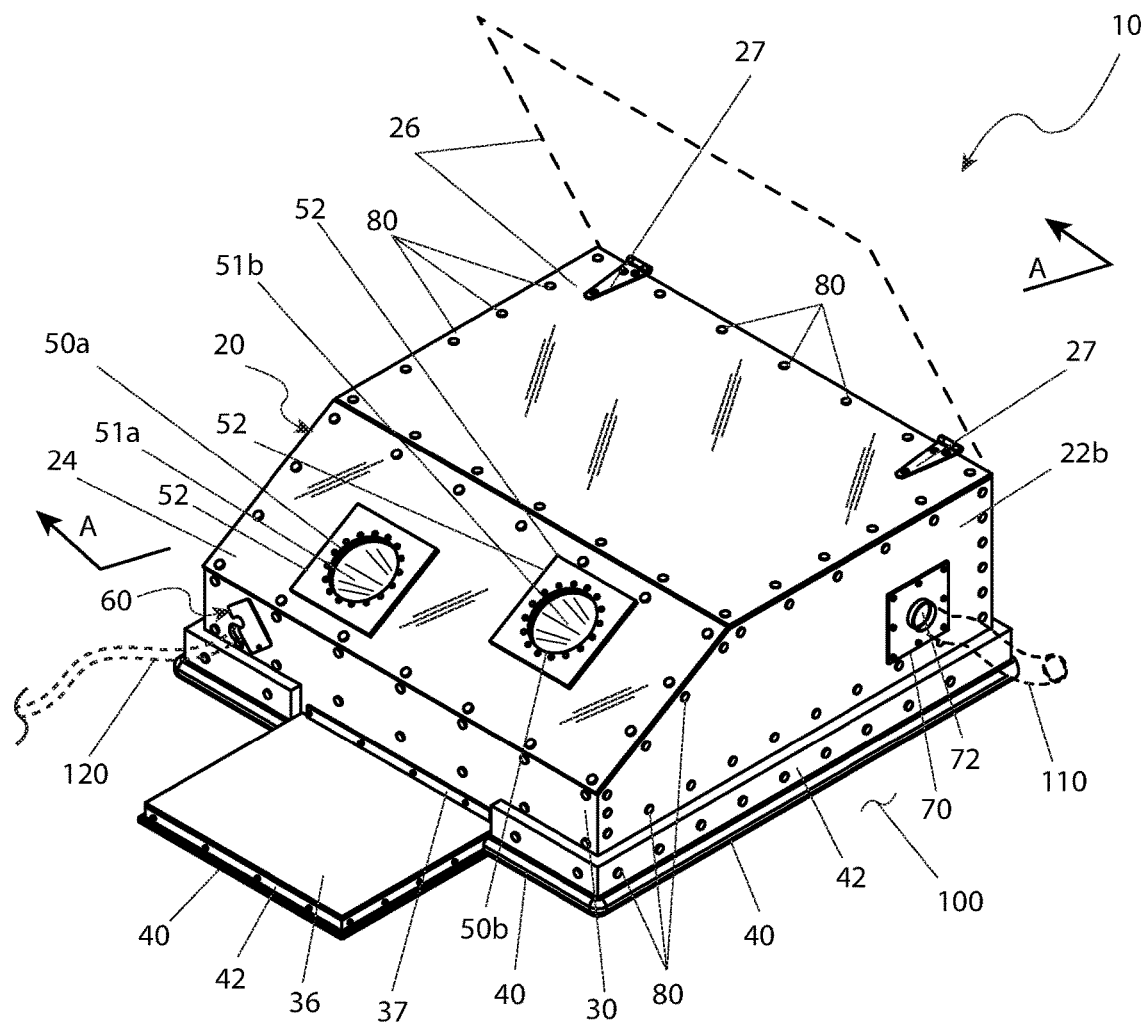
FIG. 1 is an upper perspective view of a portable enclosure for hazardous processing 10 in accordance with the preferred embodiment of the present invention.

DESCRIPTIVE KEY 10 portable enclosure for hazardous processing
20 workbox assembly
22a first side panel
22b second side panel
24 glove port panel
26 lid panel
27 hinge
28 rear panel
30 front panel
32 angle bracket
36 kneeling board
37 kneeling board flange
40 gasket
42 gasket flange
50a left-hand glove port
50b right-hand glove port
51a left-hand glove
51b right-hand glove 52 glove clamp plate
53 glove sleeve
54 sleeve flange
60 cord aperture assembly
62 cord aperture
63 first slot
65 cover plate
67 second slot
68 pivot fastener
70 vacuum hose port
72 female nozzle
80 fastener
82 work space
84 work piece
86 tool
90 user
95 arm
100 floor/work surface
110 vacuum hose
120 power cord
121 plug

DETAILED DESCRIPTION OF THE PREFERRED EMBODIMENT

The best mode for carrying out the invention is presented in terms of its preferred embodiment, herein depicted within FIGS. 1 through 4b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a portable enclosure for hazardous processing (herein described as the "apparatus") 10, which provides an isolation enclosure designed to protect a user 90 while performing hazardous processes upon a work piece 84 such as grinding, sanding, drilling, painting, chemical washing, and the like. The apparatus 10 is portable and is intended to be placed over a work piece 86 positioned upon a floor surface 100, thereby allowing performance of hazardous processing without having to move or lift the work piece during processing.

Figure 2:
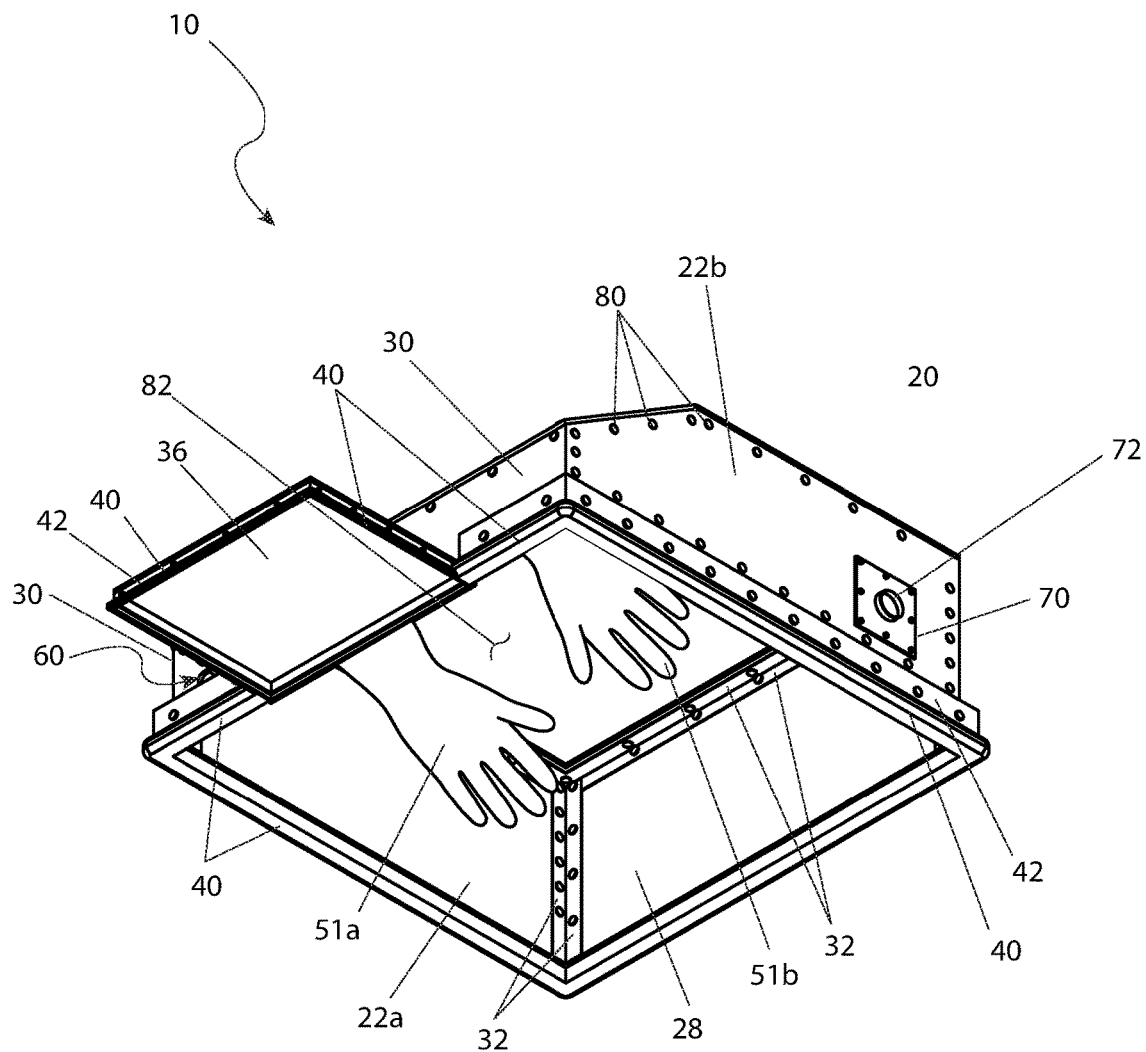
FIG. 2 is a lower perspective view of the portable enclosure for hazardous processing 10 in accordance with the preferred embodiment of the present invention.

Referring now to FIGS. 1 and 2, upper and lower perspective views of the apparatus 10, in accordance with the preferred embodiment of the present invention, are disclosed. The apparatus 10 provides an open-bottom workbox assembly 20, having an internal work space 82 which is accessible to a user 90 via a left-hand glove port 50a and a right-hand glove port 50b.

The workbox assembly 20 is envisioned to be approximately thirty inches (30 in.) in width by approximately thirty inches (30 in.) in depth at the base, and be approximately eighteen inches (18 in.) in height. However, it is understood that various models of the workbox assembly 20 would be available in different sizes so as to enable processing to be performed on different sized work pieces 84 using a variety of differently sized tools 86, and as such should not be a limiting factor of the apparatus 10.

The workbox assembly 20 includes a first side panel 22a and a parallel second side panel 22b, a glove port panel 24, a hinging lid panel 26, a rear panel 28, and a front panel 30. The panel portions 22a, 22b, 24, 26, 28, 30 of the workbox assembly 20 are connected to each other along internal adjacent edge portions to create a rigid open-bottom box-like structure using a plurality of connecting ninety degree angle (90°) brackets 32. A plurality of corresponding equally-spaced fasteners 80 such as rivets, screws, and the like, would be used to affix the panels 22a, 22b, 24, 26, 28, 30 to the angle brackets 32. The panels 22a, 22b, 24, 26, 28, 30 are envisioned to be made using a hard plastic extruded sheet material such as Acrylic (polymethlamethacrylate), Butyrate (cellulose acetate butyrate), Lexan® (polycarbonate), or the like, being approximately one-quarter of an inch (¼ in.) in thickness. The glove port panel 24 and the lid panel 26 are to be made of a transparent plastic composition of the aforementioned material so as to enable easy viewing of the processing within the workbox assembly 20 (see FIG. 3).

The glove port panel portion 24 of the workbox assembly 20 further includes a left-hand glove port 50a and a right-hand glove port 50b. The glove ports 50a, 50b further include respective left-hand glove 51a and right-hand glove 51b portions, each including an elongated glove sleeve 53 and a clamped sleeve flange portion 54, thereby providing an air-tight connection to the workbox assembly 20. The glove port panel 24 is positioned at an inclined angle to provide for easy insertion of arm portions 95 of the user 90 into the glove ports 50a, 50b (see FIG. 3).

The apparatus 10 is intended to be utilized upon a flat work surface 100 such as a floor, a workbench, and the like. A kneeling board 36 is affixed to a proximal bottom edge portion of the workbox assembly 20 via an integral and upwardly extending kneeling board flange 37 and corresponding fasteners 80. The kneeling board 36 is envisioned to be made using a similar plastic material as the aforementioned panels 22a, 22b, 24, 26, 28, 30. The kneeling board 36 allows a user 90 to comfortably kneel during processing, as well as using the weight of the user 90 to secure the apparatus 10 upon the subjacent work surface 100 (see FIG. 3).

The top lid panel portion 26 of the apparatus 10 is illustrated here in a preferred embodiment being attached along perimeter edges with a plurality of fasteners 80. Additionally, the lid panel 26 is attached via a pair of hinges 27. The hinges 27 are positioned along a rear edge of the workbox assembly 20 to the lid panel 26 and the rear panel 28 using additional fasteners 80 (see FIG. 3). Based upon a user's preferences and the hazards presented by a particular process, the fasteners 80 along the perimeter edges of the lid panel 26 may be removed to allow easy raising of the lid panel 26 about its hinges 27 to access the internal work space 82, as needed. Also, the lid 26 may have a sealing means to seal the interior from the environment.

The bottom perimeter edges of the workbox assembly 20, as well as the perimeter edges of the forwardly extending kneeling board 36, provide a means of sealing the apparatus 10 to a subjacent work surface 100 via a linear tubular rubber gasket 40 being affixed all around the perimeter edges. The gasket 40 includes an integral and upwardly extending gasket flange portion 42 which enables attachment of the gasket 40 to the lower edge portions of the workbox assembly 20 and kneeling board 36 portions using additional fasteners 80.

The apparatus 10 also includes a cord aperture assembly 60 being integral to the front panel 30. The cord aperture assembly 60 enables penetration and insertion of a power cord portion 120 of various power tools 86 used within the apparatus 10 such as drills, grinders, and the like. The cord aperture assembly 60 includes a pivoting cover plate 65 which enables insertion of a large plug portion 121 as well as acting to partially cover and therefore minimize a size of a cord aperture portion 62 (see FIGS. 4a and 4b).

The apparatus 10 also includes a plastic or rubber vacuum hose port 70 for the connection of an existing vacuum hose portion 110 of a shop vacuum or similar air removal and/or filtration equipment. Attachment of the vacuum hose 110 to the workbox assembly 20 enables the existing air removal and/or filtration equipment to maintain a negative pressure within the workbox assembly 20 as well as continuously removing particulate and chemical pollutants during processing. The vacuum hose port 70 includes a flat portion which allows an air-tight attachment of the vacuum hose port 70 to the workbox assembly 20 using a plurality of fasteners 80. The vacuum hose port 70 further includes an integral and outwardly extending female nozzle portion 72 being particularly sized so as to receive and retain a standard sized vacuum hose 110 via a friction fit. The vacuum hose port 70 is shown here being located along the second side panel portion 22b of the workbox assembly 20; however, it is understood that the vacuum hose port 70 may be located at a variety of locations along the panel portions 22a, 22b, 28, 30 with equal benefit, and as such should not be interpreted as a limiting factor of the apparatus 10. It is also appreciated that the vacuum hose port 70, or the female nozzle portion 72, may include a selectable cover to restrict incremental flow of air removal within the workbox assembly 20.

Figure 3:
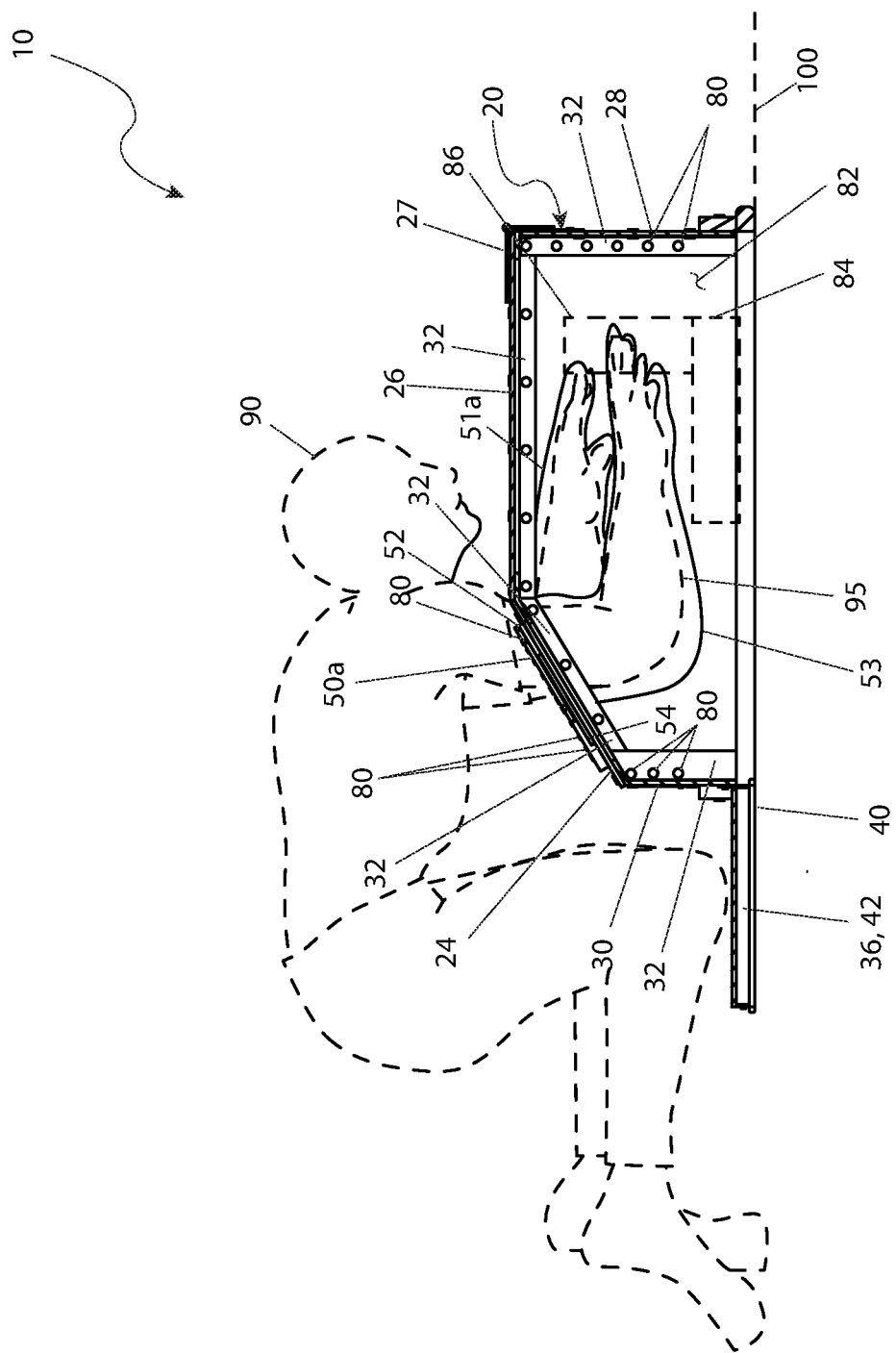
FIG. 3 is an environmental section view of the portable enclosure for hazardous processing 10 taken along section line A-A (see FIG. 1), according to a preferred embodiment of the present invention.

Referring now to FIG. 3, an environmental section view of the apparatus 10 taken along section line A-A (see FIG. 1), according to a preferred embodiment of the present invention, is disclosed. The apparatus 10 is depicted here being utilized by a user 90 to perform processing upon a work piece 84 within the workbox assembly 20 using a tool 86 while in a kneeling position. The kneeling board 36 is being utilized here by the user 90 to kneel and secure the apparatus 10 upon the work surface 100, as well as to allow the user 90 to comfortably observe the processing of the work piece 84 through the transparent glove port panel 24 and lid panel 26 portions. The user 90 is seen here having their left arm 95 inserted within the left-hand glove port 50a. Furthermore, the user 90 is grasping a tool 86 such as a grinder, drill, or the like, and performing a process upon the work piece 84.

The left-hand 51a and right-hand 51b gloves are envisioned to be made using a flexible, chemical-resistant grade of rubber, and having long glove sleeve portions 53. The glove sleeves 53 are envisioned to provide molded sleeve flanges 54 which are to be clamped between the glove port panel 24 and a removably attached rectangular glove clamp plate 52 which is affixed along a perimeter edge to the glove port panel 24 via a plurality of fasteners 80 (also see FIG. 1).

Referring now to FIGS. 4a and 4b, close-up views of a cord aperture assembly 60 depicting respective open and closed states, according to a preferred embodiment of the present invention, are disclosed. The cord aperture assembly 60 provides a means to extend a power cord portion 120 of an existing power-type tool 86 within the workbox assembly 20 through the front panel 30. The cord aperture assembly 60 enables insertion of the plug-end 121 through a keyhole-shaped cord aperture portion 62 being machined or formed within the front panel 30. A pivoting cover plate 65 subsequently pivots downwardly to partially cover the cord aperture 62, thereby minimizing an open area of the cord aperture 62.

The cord aperture 62 is integral to the front panel 30 and provides a round or oval-shaped opening. The cord aperture 62 further includes an integral narrow first slot portion 63 which extends downwardly from a bottom edge of the cord aperture 62. The first slot 63 is to have a slightly wider diameter than that of the power cord 120. In a complementing manner, the rectangular cover plate 65 has a recessed second slot 67 along a bottom edge being of a similar diameter as the aforementioned first slot 63. When the cover plate 65 is pivoted about its pivot fastener 68 to its downward closed position, the first slot 63 and second slot 67 portions are aligned and act to entrap the power cord 120 snuggly within to minimize the open area of the cord aperture 62.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 through 4b.

The method of installing and preparing the apparatus 10 for use may be achieved by performing the following steps: procuring a model of the apparatus 10 having desired overall dimensions; placing at least one (1) work piece 84 and at least one (1) existing tool 86 upon a flat work surface 100 such as a floor surface, workbench, or the like; placing the workbox assembly 20 down over the work piece 84 and the tool 86; routing a power cord portion 120 of the tool 86, through the cord aperture assembly 60 by pivoting the cover plate portion 65 of the cord aperture assembly 60 upwardly; inserting the arm portions 95 of the user 90 into the gloves 51a, 51b; grasping and motioning a plug portion 121 of the power cord 120 through the cord aperture 62; lowering the cover plate 65 so as to entrap the power cord 120 within the first 63 and second 67 slots; inserting the plug 121 into an available power source; and, connecting the vacuum hose portion 110 of existing vacuum and/or filtration equipment to the female nozzle portion 72 of the vacuum hose port 70. The apparatus 10 is now ready for use.

The method of utilizing the apparatus 10 may be achieved by performing the following steps: activating the existing vacuum and/or filtration equipment to create a negative pressure within the workbox assembly 20 as well as to provide continuous removal of particulate and chemical pollutants from within the workbox assembly 20 during processing; allowing a user 90 to kneel upon the kneeling board 36, if desired; inserting the arm portions 95 of the user 90 into the gloves 51a, 51b; allowing the user 90 to observe the work piece 84 and subsequent processing through the transparent glove port panel 24 and lid panel 26; positioning the work piece 84 as needed using the gloves 51a, 51b; grasping and activating the tool 86 using the gloves 51a, 51b; performing processing upon the work piece 84 using the tool 86 such as grinding, sanding, drilling, and the like; completing processing upon the wok piece 84; processing additional work pieces, as needed, by withdrawing a user's arms 95 from the gloves 51a, 51b; waiting a sufficient period of time for the existing vacuum and/or filtration equipment to remove all particulate and chemical pollutants from within the workbox assembly 20; lifting the workbox assembly 20 from the work surface 100; removing the finished work piece 84 from the work space 82 and placing another work piece 84 upon the work surface 100; replacing the workbox assembly 20 upon the work surface 100; repeating the above processing steps as described above until finishing processing all work pieces 84; deactivating the tool 86; removing the arm portions 95 of the user 90 from the gloves 51a, 51b; deactivating the existing vacuum and/or filtration equipment; and, benefiting from a portable means to safely perform various processes upon a variety of different work pieces 84, afforded a user of the present invention 10.

It is also envisioned that particular processes may allow a user 90 to access the work piece 84 and/or the tool 86 by tilting the lid panel 26 upwardly upon the hinges 27. This method of access would be dependant upon a user's preferences and the hazards presented by a particular process being performed. Access into the work space 82 through the lid panel 26 would allow a user 90 quick access to the work piece 84 and/or the tool 86 instead of having to lift the workbox assembly 20 from the work surface 100 as described above.

It is also understood that the present invention 10 is not limited to the aforementioned described processes, and that various other processes may be performed upon the work piece 84 using the apparatus 10 such as, but not limited to: spraying, chemical washing and treating, plating, welding, soldering, and the like, and as such should not be interpreted as a limiting factor of the apparatus 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A portable enclosure, comprising:
    an assembly, comprising:
        a first side panel;
        a second side panel parallel to said first side panel;
        a rear panel, affixed between rear sides of said first side panel and said second side panel;
        a front panel, affixed between front sides of said first side panel and said second side panel;
        a glove port panel, affixed between angled portions of a top side of said first side panel and said second side panel, and a top side of said front panel; and,
        a lid panel, having a rear edge hingedly attached to a top edge of said rear panel, said lid panel covering over portions of said top side of said first side panel and said second side panel rearward of said glove port panel;
    a cord aperture located on said front panel;
    a cover plate pivotally attached to said front panel adjacent said cord aperture, capable of selectively partially covering said cord aperture;
    a hose port located on either said first side panel or said second side panel capable of providing a sealed connection to a hose;
    a cover plate pivotally attached to said front panel adjacent said cord aperture, capable of selectively partially covering said cord aperture;
    a first glove port located on said glove port panel towards said first side panel;
    a first glove affixed to said first glove port and extending within an interior of said assembly and sealed from an environment outside said assembly;
    a second glove port located on said glove port panel towards said second side panel;
    a second glove affixed to said second glove port and extending within an interior of said assembly;
    a board affixed to a proximal bottom edge portion of the said assembly and extending away from said front panel and said glove port panel; and,
    a sealing means for sealing bottom perimeter edges of said assembly and said board to a subjacent support surface.

2. The portable enclosure of claim 1, further comprising a plurality of brackets affixing adjacent panels to each other.

3. The portable enclosure of claim 2, wherein said plurality of brackets are each a connecting ninety-degree angle bracket.

4. The portable enclosure of claim 1, wherein said glove port panel and said lid panel are transparent.

5. The portable enclosure of claim 1, wherein said first and second gloves each comprise a flexible, chemical-resistant material.

6. The portable enclosure of claim 5, wherein:
    said first glove is affixed to said first glove port with a first sleeve flange; and,
    said second glove is affixed to said second glove port with a second sleeve flange.

7. The portable enclosure of claim 6, further comprising:
    a first glove clamp plate affixed to said glove port panel about a perimeter edge of said first glove port;
    a second glove clamp plate affixed to said glove port panel about a perimeter edge of said second glove port; and,
    wherein said first sleeve flange is clamped between said glove port panel and said first glove port plate; and,
    wherein said second sleeve flange is clamped between said glove port panel and said second glove port plate.

8. The portable enclosure of claim 7, wherein said first glove port and said second glove port are not coaligned along a common bisecting axial centerline through said glove port panel.

9. The portable enclosure of claim 1, wherein said sealing means is a rubber gasket.

10. The portable enclosure of claim 9, wherein said rubber gasket further comprises an integral and upwardly extending gasket flange.

* * * * *